United States Patent Office 3,120,539
Patented Feb. 4, 1964

3,120,539
10-ACYL DERIVATIVES OF AJMALICINE AND PROCESS THEREFOR
John Shavel, Jr., Mendham, N.J., assignor to Warner-Lambert Pharmaceutical Company, Morris Plains, N.J., a corporation of Delaware
No Drawing. Filed Feb. 10, 1961, Ser. No. 88,304
4 Claims. (Cl. 260—294.3)

The present invention relates to new and novel 10-acyl derivatives of ajmalicine of the formula:

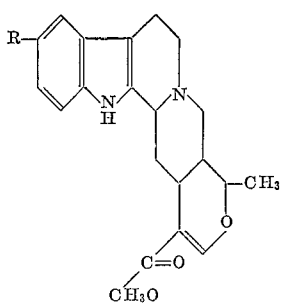

wherein R is the acyl radical of the aliphatic carboxylic acid containing 1 to 6 carbon atoms and to the non-toxic acid addition and quaternary ammonium salts thereof. This invention also relates to a method of producing these compounds.

The compounds of this invention are derivatives of the alkaloid ajmalicine of the yohimbane series. They have interesting pharmacological activity and are useful as analgesics, tranquilizers and hypotensive agents. In addition, they are valuable intermediates in the production of other compounds of the yohimbane series.

Included within the scope of this invention are such 10-acyl derivatives of ajmalicine as 10-acetylajmalicine, 10-propionylajmalicine, 10 - butyrylajmalicine, 10-valerylajmalicine and the like.

It has now been found that the compounds of my invention of the above formula may be prepared by treating the known ajmalicine at between +25° C. and −40° C. with an acid anhydride or acyl halide having R acyl groups in the presence of a Friedel-Crafts catalyst. The reaction is one of acylation with an R acyl group being substituted at the 10-position of the ajmalicine starting material. The reaction is carried out in the liquid phase under anhydrous conditions in the presence of a Friedel-Crafts catalyst such as boron trifluoride, aluminum chloride, aluminum bromide, stannic chloride, ferric chloride, ferric bromide, hydrofluoric acid, polyphosphoric acid, titanium tetrachloride, sulfuric acid and the like, with boron trifluoride being particularly effective. The reaction mixture may also contain a carboxylic acid or a carboxylic acid ester corresponding to the acid halide or acid anhydride, that is, a carboxylic acid of the formula ROH, or an ester of the formula $ROR_1$, wherein $R_1$ is a lower alkyl group.

In carrying out the reaction, the acylating agent (acid anhydride or acyl halide), either with or without the corresponding acid or ester, is initially saturated with catalyst at a temperature between about −20° C. and +10° C. The temperature of the mixture is then adjusted to the desired reaction temperature and the ajmalicine starting material is added, either as a solid or as a solution in the acylating agent or in an inert organic solvent, such as methylene chloride, dioxan, tetrahydrofuran and the like. The reaction mixture is then stirred at the reaction temperature to completion and the product is recovered therefrom by conventional techniques of extraction, crystallization and chromatography.

It is to be understood that the new and novel compounds of this invention may be used as the free base or may be converted into the corresponding pharmaceutically acceptable non-toxic acid addition and quaternary ammonium salts. Exemplary of non-toxic acid addition salts are those formed with maleic, fumaric, benzoic, ascorbic, succinic, bismethylenesalicylic, methylsulfonic, ethanedisulfonic, acetic, propionic, tartaric, salicylic, citric, gluconic, lactic, malic, mandelic, cinnamic, citraconic, stearic, palmitic, itaconic, glycolic, benzenesulfonic, hydrochloric, hydrobromic, sulfuric, sulfamic, phosphoric and nitric acids. The acid addition salts may be prepared in the conventional manner, for example, by treating a solution or suspension of the free base in an organic solvent with the desired acid, and then recovering the salt which forms by crystallization techniques. The quaternary salts are prepared by heating a suspension of the base in a suitable solvent with a reactive alkyl halide such as methyl iodide, ethyl bromide, n-hexyl bromide, benzyl chloride or a reactive ester such as methyl sulfate, ethyl sulfate or methyl p-toluene sulfonate.

For therapeutic use, the new and novel compounds of this invention, as the free base, or as their acid addition or quaternary ammonium salts, may be formulated with conventional pharmaceutical carriers into dosage unit forms, such as tablets, capsules, elixirs, suppositories, solution, suspensions and the like.

The following example is included in order further to illustrate the present invention:

Example

A mixture of 15 ml. glacial acetic acid and 100 ml. acetic anhydride is saturated with boron trifluoride at −10° C. by passing boron trifluoride into the solution for 15 minutes. The solution is cooled to −20° C. and 25 g. ajmalicine are added. The mixture is stirred for two hours at −20° C. and then poured onto crushed ice. The suspension is made basic with ammonium hydroxide, extracted with chloroform and the extract is dried over sodium sulfate, filtered and evaporated to an oil. The oil is taken up with 5 N acetic acid, basified with ammonium hydroxide and again extracted with chloroform. The extract is distilled to evaporate the chloroform to yield an oil which is crystallized from acetonitrile to yield 17.7 grams in two crops. Two recrystallizations from methanol yield 10-acetylajmalicine as the hemihydrate, M.P. 149–154° C. (dec.), $[\alpha]_D^{25}$ −26° (pyridine, c.=1.0).

*Analysis.*—Calc.: C, 68.47; H, 6.75; N, 6.94. Found: C, 68.13, H, 6.94; N, 6.99.

It is understood that the foregoing detailed description is given merely by way of illustration and that many variations may be made therein without departing from the spirit of my invention.

Having described my invention, what I desire to secure by Letters Patent is:

I claim:

1. A member selected from the group consisting of compounds of the formula:

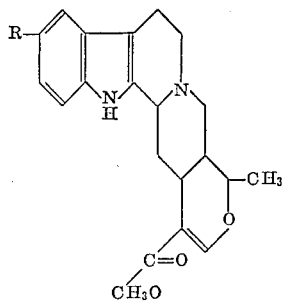

wherein R is the acyl radical of an unsubstituted saturated aliphatic carboxylic acid of 1 to 6 carbon atoms and the pharmaceutically acceptable non-toxic acid addition and quaternary ammonium salts thereof with a compound selected from the group consisting of methyl iodide, ethyl bromide, n-hexyl bromide, benzyl chloride, methyl sulfate, ethyl sulfate and methyl p-toluene sulfonate.

2. 10-acetylajmalicine.

3. A method of preparing a compound of the formula:

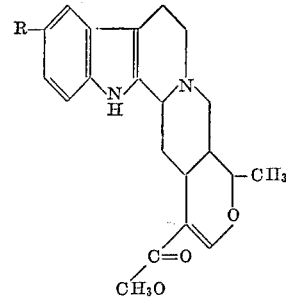

wherein R is the acyl radical of an aliphatic carboxylic acid containing 1 to 6 carbon atoms which comprises treating ajmalicine with a member selected from the group consisting of a carboxylic acid anhydride $(R)_2O$ and a carboxylic acid halide R—X wherein R is defined above and X is halogen at a temperature between $+25°$ C. and $-40°$ C. in the presence of a Friedel-Crafts catalyst.

4. A method according to claim 3 wherein said Friedel-Crafts catalyst is boron trifluoride.

No references cited.